United States Patent
Badt et al.

[11] Patent Number: 5,959,974
[45] Date of Patent: *Sep. 28, 1999

[54] SYSTEM AND METHOD FOR DISCOVERING PATH MTU OF INTERNET PATHS

[75] Inventors: Daniel Edward Badt, Austin; David Richard Marquardt, Round Rock; Satyanarayana Billekal Rao, Austin; Lance Warren Russell, Fredericksburg; Larry Steven Wise, Austin, all of Tex.

[73] Assignee: International Business Machines Corporation, Armonk, N.Y.

[*] Notice: This patent is subject to a terminal disclaimer.

[21] Appl. No.: 08/755,864

[22] Filed: Dec. 2, 1996

[51] Int. Cl.$^6$ .................................................. G01R 31/08
[52] U.S. Cl. ........................ 370/233; 370/253; 370/400
[58] Field of Search .................................. 370/248, 249, 370/400, 401, 402, 389, 392, 465, 474, 233, 252, 253

[56] References Cited

U.S. PATENT DOCUMENTS

| | | |
|---|---|---|
| 4,688,168 | 8/1987 | Gudaitis et al. . |
| 5,251,205 | 10/1993 | Callon et al. . |
| 5,410,754 | 4/1995 | Klotzbach et al. . |
| 5,425,023 | 6/1995 | Haraguchi et al. ........................ 370/60 |
| 5,473,599 | 12/1995 | Li et al. . |
| 5,504,757 | 4/1996 | Cook et al. . |
| 5,519,704 | 5/1996 | Farinacci et al. . |
| 5,528,595 | 6/1996 | Walsh et al. . |
| 5,619,645 | 4/1997 | Montenegro et al. ............. 395/185.01 |
| 5,651,006 | 7/1997 | Fujino et al. ............................ 370/408 |
| 5,751,971 | 5/1998 | Dobbins et al. ................... 395/200.68 |

OTHER PUBLICATIONS

Information Sciences Institute, Internet Protocol, Sep. 1981, pp. 11–13.

*Primary Examiner*—Chi H. Pham
*Assistant Examiner*—Kim T. Nguyen
*Attorney, Agent, or Firm*—Robert M. Carwell

[57] ABSTRACT

A local system issues an ICMP echo request packet with a size based on an initial PMTU value corresponding to that of the local system's interface MTU. When an ICMP need-frag error packet is received by the local system, this signifies that the initial PMTU value was too large for packets of corresponding size to be transmitted through the Internet without fragmentation. The value is accordingly decreased by the local system and a next ICMP echo request packet transmitted through the Internet. The process iterates until an ICMP echo request packet is successfully transmitted through the Internet to a target system. In response thereto, the target system transmits an ICMP echo response packet back through the Internet to the local system, thereby indicating that the last-sent ICMP echo request packet from the local system had the correct PMTU value which is thereafter assumed to be the correct PMTU.

6 Claims, 3 Drawing Sheets

SYSTEM AND METHOD FOR DISCOVERING PATH MTU OF INTERNET PATHS

CROSS REFERENCE TO RELATED APPLICATIONS

The present invention appears to claim subject matter disclosed in application, Ser. No. 08/755,8677 IBM Docket AT9-96-309, filed on Dec. 02, 1996.

TECHNICAL FIELD

This invention relates to computer communication through the Internet and, more particularly, to systems and methods for avoiding fragmentation of data transmitted across the Internet.

BACKGROUND OF THE INVENTION

Referring first to FIG. 1, depicted therein is a network-wide view of a typical system for communicating across the Internet 12 between a local system 10 and a target system 14. In such a system, information is transmitted between systems 10 and 14 in the form of data packets sent over the Internet. It has long been known that fragmentation of such data packets by routers 1–N, 24, 26, 30, is generally undesirable. The reason is that such fragmentation and reassembly is an expensive and time consuming process which causes applications to wait until all fragments are received and reassembled. Thus, it is desirable to determine the largest size packet which may be transmitted without being fragmented.

Maximum transfer unit (MTU) of a network interface is defined as the maximum size of the data packet that can be sent out over the network interfaces 16 and 20. Internet 12 is comprised of many networks with different MTUs. Internet traffic usually undergoes fragmentation at the source node and reassembly at the receiving node if the size of the data packet is larger than the MTU of the outgoing interface or the interface of an intermediate router 24–30. However, as already noted, such fragmentation and reassembly is a time consuming and expensive process and causes applications to wait until all fragments are received and reassembled. It is possible to specify that Internet Protocol (IP) data not be fragmented, however this causes IP packets which are larger than the MTUs to be dropped.

Path MTU (PMTU) of an Internet path is defined as the minimum of the MTUs of all of the segments that the path is comprised of. Data fragmentation and reassembly can be avoided if the path MTU of the Internet path between the source and the destination was known. The IETF (Internet Engineering Task Force), which has assumed responsibility for the continued development of the Internet, has published a "Request for Comment" or RFC 1191 which describes a technique for discovering PMTUs of Internet paths by utilizing the "Don't Fragment" (DF) bit in the IP header to discover the PMTU. Setting this DF option in the outgoing data (payload) IP packets enables the sending node to receive an error when the IP packet cannot be sent out because it is larger than the MTU of the outgoing interface and, as a result, the data packet is dropped. The source host 10 initially assumes the PMTU of the path is the known MTU of the first hop, and sends all packets with the DF bit set. If any of the routers 24–30 cannot forward the datagrams without fragmentation, the particular router will discard them and return a "Destination Unreachable, DF set and Fragmentation Required" (Needfrag Error) ICMP message and the source host reduces its assumed PMTU. The PMTU discovery process ends when datagrams are delivered without error or the host may elect to end the discovery process by ceasing to set the DF bit.

While packet drops and data loss were not major issues for classical Internet applications such as mail, FTP, Telnet, etc., they can cause serious quality-of-service (QOS) problems for applications involving multimedia data, such as audio and video teleconferencing, video serving, etc. Data packet drop must be kept to a minimum for such applications, as they may involve real-time data encoding and hence retransmission of a lost or dropped packet may simply not be an option. Therefore, specifying not to fragment IP data may not be useful for multimedia data if there is a need to avoid fragmentation and reassembly for performance reasons.

Previous systems have employed the DF mechanism described in RFC 1191. However, a major flaw in such systems is that the DF bit is sent in actual data. For example, a video server might set the DF bit in accordance with RFC 1191 but only in actual video packets. At least two serious problems arise in so doing. First, in discovering a PMTU, because the DF bit is sent in actual data, failure points in the path may cause actual data packets to be dropped, resulting in lost data. Secondly, again because the DF bit is sent in actual data, it was heretofore impossible to discover the PMTU until the system began transmitting actual data. Yet a further problem of known systems relates to the fact that PMTUs of a path may change over time due to changes in routing topology. Existing PMTU discovery process was ill suited to dynamically detecting changes in PMTU due to the aforementioned route changes.

SUMMARY OF THE INVENTION

A local system issues an ICMP Echo Request Packet with an initial size corresponding to that of the local system's interface MTU. When an ICMP Needfrag Error Packet is received by the local system, this signifies that the initial PMTU value was too large for packets of corresponding size to be transmitted through the Internet without fragmentation. The value is accordingly decreased by the local system and a next ICMP echo request packet transmitted through the Internet. The process iterates until an ICMP echo request packet is successfully transmitted through the Internet to a target system. In response thereto, the target system transmits an ICMP echo response packet back through the Internet to the local system, thereby indicating that the last-sent ICMP Echo Request Packet from the local system had the correct PMTU value which is thereafter assumed to be the correct PMTU.

DETAILED DESCRIPTION OF THE PREFERRED EMBODIMENT

Figure 1:
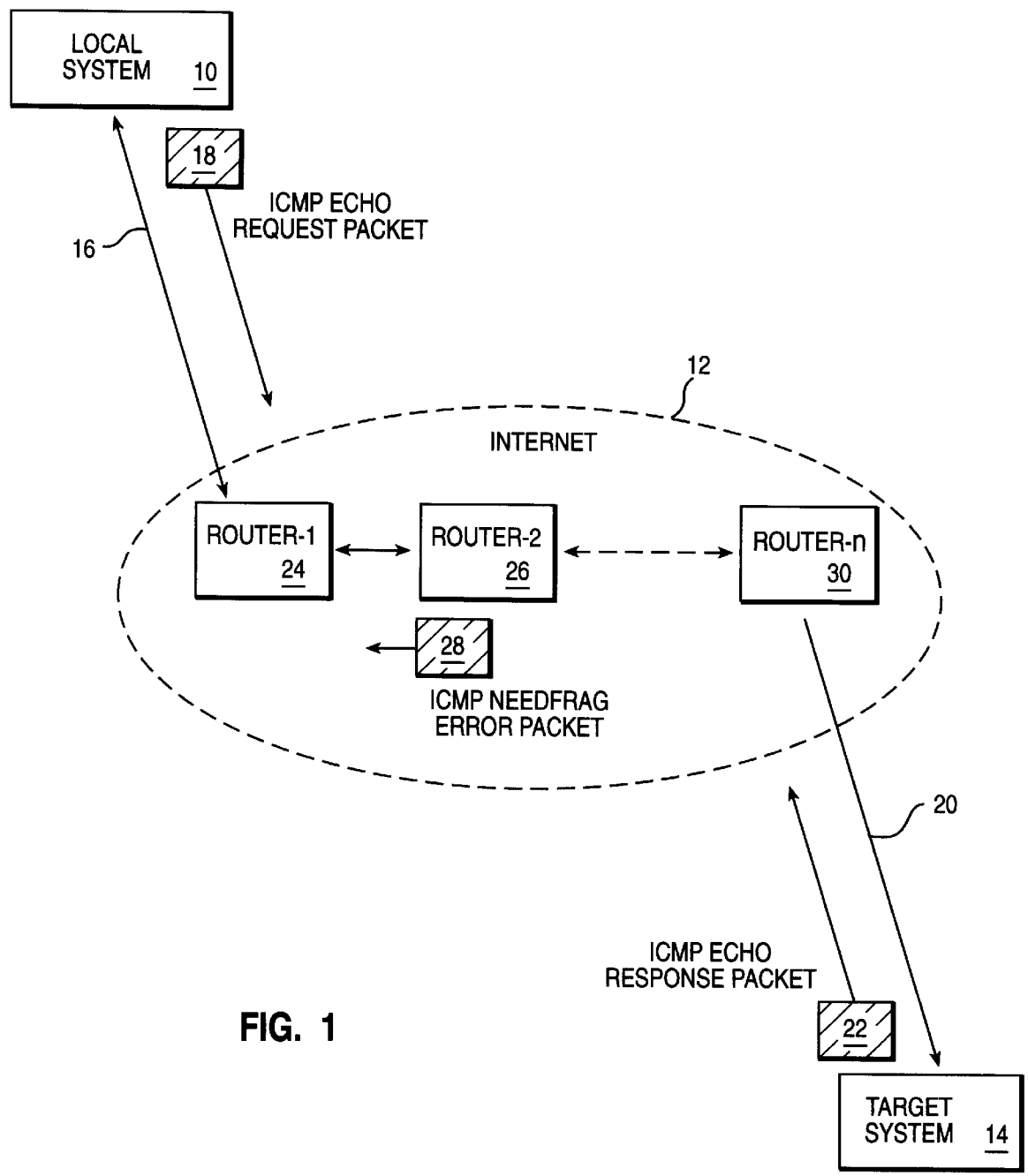
FIG. 1 is a functional block diagram of a typical Internet network depicting the use of ICMP Echo Request, Needfrag Error, and Echo Response Packets in accordance with the invention.

Turning now to FIG. 1 in greater detail, it will be recalled that an objective of the invention is to enable a local system 10 to discover the largest unfragmented packet size that can be sent to a target system 14 over the Internet 12. Accordingly, the local system 10 will first transmit an ICMP echo request packet 18 (hereinafter described in greater detail) through the local interface 16, through the various routers 24, 26, 30, and ultimately to the local interface 20 of the target system 14 and the target system 14.

If at some point in the path in the Internet 12, the ICMP echo request packet 18 is too large to be transmitted through one of the routers (such as router 26 in FIG. 1) the affected router will transmit back an ICMP needfrag error packet 28 to the local system 10. Receipt of such needfrag error packet 28 serves as an indication to the local system 10 that the size of the echo request packet 18 was too large. Accordingly, in response to such information, the local system 10 will thereafter select (in a manner to be hereinafter described in greater detail) a smaller size echo request packet 18 and an attempt will be made to transmit this smaller packet through the Internet 12 to the target system 14. Again, if a router is incapable of transmitting the echo request packet 18, it will, in a similar manner to the previously described failure, transmit a corresponding ICMP needfrag error packet back to the local system 10.

Assuming that eventually, by the repeated process of downsizing the size of the echo request packets, the transmission is completed from the local system 10 through the Internet 12 to the target system 14, an ICMP echo response packet 22 will be generated by the target system 14 acknowledging this packet. This echo response packet will then be transmitted back from the target system 14 through the Internet 12 to the local system 10. When the local system 10 receives such an echo response packet 22, the local system 10 is thereby informed that a PMTU has been established.

It is important at this point to underscore an important distinction over prior attempts to establish PMTUs. In accordance with the teachings of the invention, an ICMP packet is utilized to discover the PMTU as distinguished from using actual data in the PMTU discovery process. By doing so, the invention is able to discover the PMTU more quickly since it will not have to wait for the application to transmit data, and will also avoid the risk of losing actual data that would be dropped by the router which was incapable of transmitting the packet.

Figure 2:
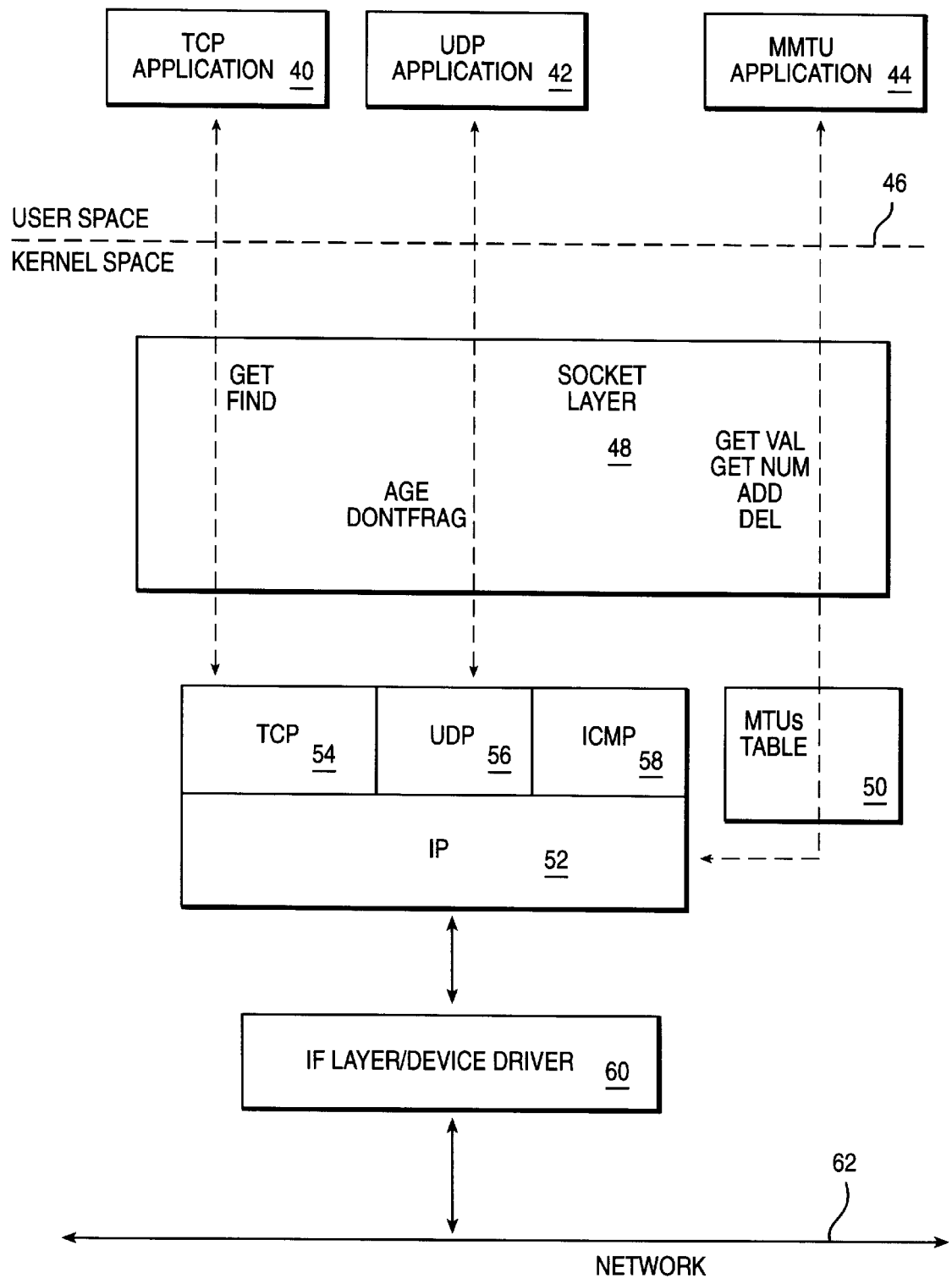
FIG. 2 is a functional block diagram of one implementation of a PMTU discovery system in accordance with the invention.

Turning now to FIG. 2, depicted therein is a functional block diagram of an embodiment of the PMTU discovery system of the invention. First it will be noted that the diagram has been separated into user space above line 46 and operating system space or more particularly kernel space of the operating system below line 46. It will be assumed that one or more applications such as the TCP application 40 and UDP application 42 executing on the local system 10 of FIG. 1 will be in need of having data associated therewith packetized according to the PMTU of the Internet 12. It will be noted in passing that the network 62 is intended to represent the local interface 16 and the Internet network 12 and the ultimate connection through interface 20 to the target system 14. Two protocols are associated with the well known TCP/IP network, namely TCP (Transmission Control Protocol) and UDP (User Datagram Protocol). A fundamental distinction in the UDP protocol is that a mechanism is not provided for detecting or resending lost packets. It is a common protocol utilized by video data applications which typically cannot afford to lose packets or frames unlike applications that transmit via TCP, for example Telnet, FTP, etc.

Important aspects of FIG. 2 relative to the innovations of the invention reside particularly with respect to the socket layer 48 and MMTU application 44 to be hereinafter described in greater detail. A UDP application 42 has the capability of generating commands to indicate that the application desires to use the PMTU discovery. Accordingly the UDP application 42 is capable of generating a "find" socket function transmitted from the application 42 to the socket layer 48 which will pass through the socket layer 48 to the UDP 56 and IP 52 protocol layers. This "find" function will ultimately inform the IP layer 52 to employ the mechanism of the invention herein described to dynamically discover PMTU. Thus, in summary, the UDP application 42 generates a "find" function to the socket layer which in turn informs the kernel that path MTU discovery initiation is desired along the route that the IP 52 is going to send along, so as to cause all packets to be packetized according to the PMTU value. The "find" function will also allow the UDP application 42 to know what that PMTU value is inasmuch as the actual packetization is done by the UDP application itself. This explains why the UDP application is in need of knowing what the PMTU value is in order to send appropriately sized packets through the system of FIG. 2 and continue attempts to avoid fragmentation. Thus, in summary, the "find" function in the socket layer 48 will turn on and off the PMTU process and further a "get" function called from the application 42 will return to the application the actual PMTU value for use by the application to correctly packetize the data.

The socket layer 48 preferably includes yet another function "age" which permits an application 40 or 42 to instruct the kernel how often an ICMP echo request packet 18 should be transmitted across the interface 16 to determine if the PMTU has changed. Yet an additional function "dontfrag" is also preferably included in the socket layer 48 to turn on and off the "DF" bit in the packets even independently of the PMTU discovery process. If the IP DF is not set, changes within the network and thus the PMTU cannot be immediately detected. Accordingly, the "dontfrag" function is provided as a mechanism enabling UDP applications to set whether the DF bit is on or off in order to determine an immediate change in the network 62 and thus in the PMTU.

Turning now to the MMTU application 44 depicted in FIG. 2, this application enables the MTU table 50 to be dynamically configured as hereinafter described. If an ICMP needfrag error packet 28 is received by the local system 10 and it does not contain the next value of the PMTU to try (caused, for example, when a router does adhere to the RFC 1191), then the kernel will employ the table 50 to select the next appropriate MTU value. The MMTU application 44 is provided to enable the MTU table 50 to be dynamically configured (as opposed to hard coded) so as to enable the user to get a finer granularity and hopefully a better estimate as to the next MTU value to select for subsequent estimates through the network 62.

Referring again to the socket layer 48 in relation to the just-described MMTU application, a number of additional function calls are preferably implemented in the layer 48 to facilitate the ability of the MMTU application 44 to configure the table 50 dynamically. Because the table 50 is in the kernel (e.g., below line 46) and the MMTU application 44 is in the user space above line 46, it should be readily apparent that a mechanism or programming interface is needed to bridge between the application 44 and table 50.

Specifically, a first such desired function "getnum" enables the application 42 to obtain the number of MTU values contained in the table 50. A second function, arbitrarily named "getval" enables the application to obtain all values of an MTU from the table 50. Yet a third function "add" would enable the application 44 to add an MTU value to the table 50, and still a fourth function "del" would enable the application to delete an MTU value from the table 50. The reason for obtaining the number of MTUs in the table is that in order to obtain or "get" MTU values, a buffer is provided and it is necessary to know what size of buffer to allocate. Obtaining the MTU value by using the "get" function is an option in the application 44 to permit displaying the current MTU values to a user.

Still referring to FIG. 2, TCP application PMTU discovery works slightly differently than in the case of UDP applications. Normally, systems which implement RFC 1191 permit the MTU discovery to be turned on for either TCP or UDP applications. Thus, when path discoveries turned on for TCP applications 40, the TCP layer 54 itself will automatically packetize the TCP applications to the correct size. In contrast, UDP is not quite as sophisticated as TCP and accordingly UDP applications must packetize their packets themselves. This gives rise to the need for the aforementioned three socket layer calls, Find, Age, Dontfrag, in order to determine the appropriate size of the PMTU packets. Thus, PMTU discovery for TCP applications is for the most part automatic in the sense that these socket layer calls are not required. It will be recalled that a typical TCP application might be Telnet or FTP whereas a UDP application might be a video server application. Generally UDP applications are not as concerned about dropping packets, whereas Telnet or FTP requires a reliable protocol. The cost of such protection against framedrops however is increased overhead.

Figure 3:
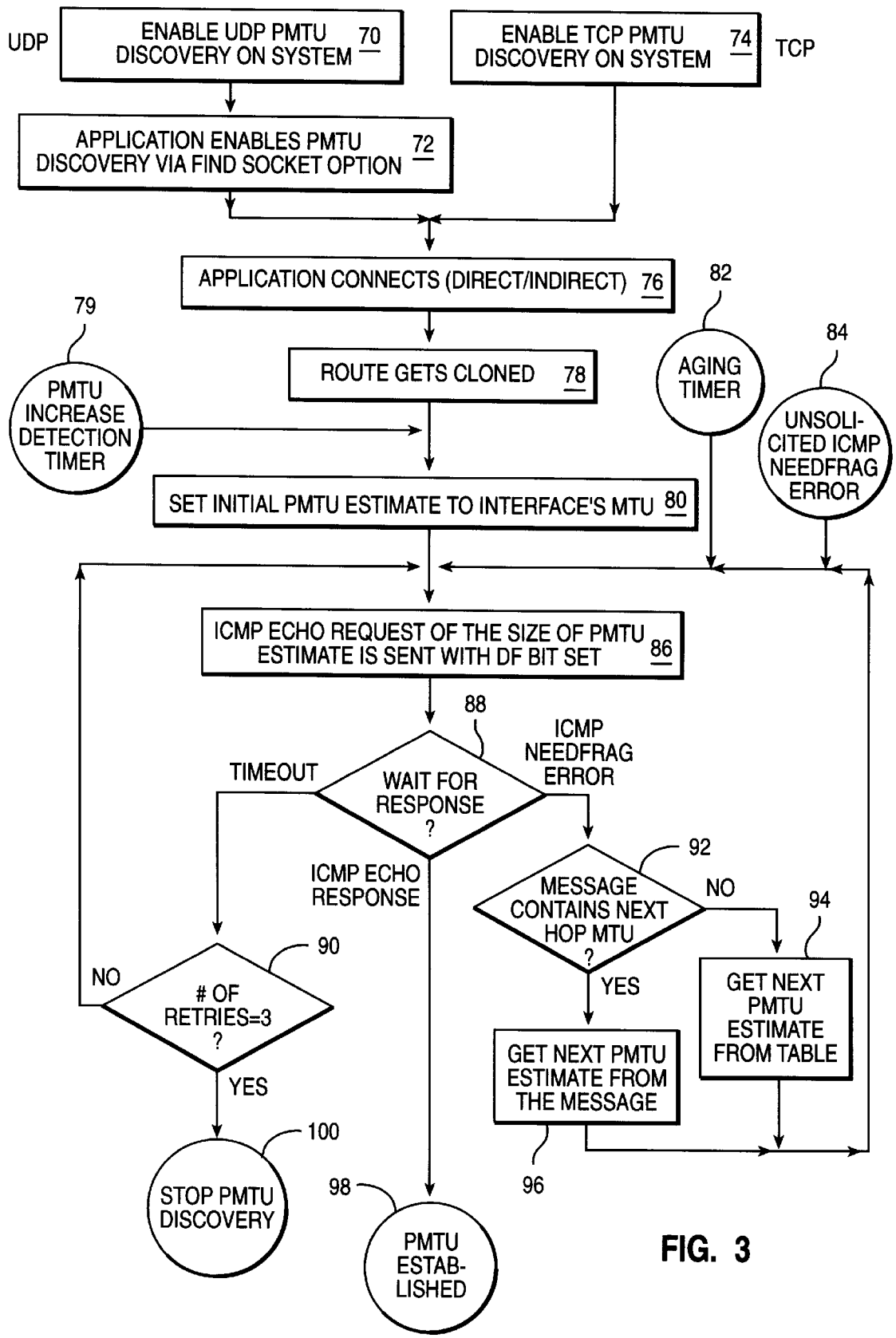
FIG. 3 is a flow diagram of the PMTU discovery process of the invention utilized in the system of FIG. 2 implemented in program code executing on the system.

Turning now to FIG. 3, illustrated therein is a flow diagram of the subject PMTU discovery process. As will be recalled from FIG. 2, first UDP PMTU discovery or TCP PMTU discovery will be enabled on the system by the respective UDP application and systemwide for TCP applications. The steps are shown at blocks 70 and 74, respectively. In the case of the UDP application, it will be recalled that the PMTU discovery is enabled via a "Find" function call option in the socket layer 48, shown at reference numeral 72. The respective application will then effect a connection, 76, through the local interface 16 to the Internet 12. Next, the route will be cloned, 78, whereupon the initial PMTU estimate is set to the interface 16's MTU, 80. This value is chosen because the PMTU obviously cannot be greater than the MTU of the interface 16 itself.

After the initial PMTU is set, a series of novel steps then transpires of particular importance in an implementation of the invention. Specifically, an ICMP Echo Request packet (18 in FIG. 1) of the size of the PMTU estimate from block 80 is then transmitted through the interface 16 to the Internet 12 with the DF bit set, 86, whereupon the local system 10 awaits a response, 88. At this point it may be assumed that an ICMP Needfrag Error Packet (28 of FIG. 1) is transmitted back from a router to the local system 10. It will be recalled that this error message indicates that the initial estimate for the PMTU in block 86 must be lowered, and consequently the local system 10 examines the Needfrag error packet 28 to determine (as shown at step 92) whether this error message contains the value of the MTU for the next hop, e.g., from router 26 to router 30. If this value for the next hop's MTU in fact was received by the local system 10, this of course signifies that the error message was returned from an RFC 1191-compliant router such as router 26. Accordingly then, the local system 10 will take as a next PMTU estimate the estimate contained in the error message, shown at block 96.

If, on the other hand, the router sending the Needfrag Error Packet was not RFC 1191-compliant, the value for the MTU of the next hop would not be contained in the message. Accordingly the system would obtain the next PMTU estimate from the MTU table 50, shown at block 94 of FIG. 3. The flow of the system would then loop back to block 86 wherein a next estimate of the value of the PMTU is transmitted in a next packet, 86 (wherein the estimate is either derived from the error message, 96, or from the table, 94). The process then will continue awaiting a next response 88 from the Internet 12, continually lowering the PMTU estimate either by means of the table or from the Error Packet until finally the Echo Response Packet (ERP), 22, is received by the local system 10 from the target system 14. This is shown at block 98, signifying that the desired PMTU has been established.

It is possible that if routers are not reachable, the process depicted in FIG. 3 will time out. If a time out occurs, the process will loop back to block 86 to again attempt to determine the PMTU. However, the mechanism may very well time out again. At block 90, this represents that the process may include a counter to monitor the number of such retries which, if exceeding a predetermined number such as 3 in block 90, will cause the PMTU discovery process of the invention to halt. In this situation, a conventional process may then be executed wherein the DF bit is not set and the application simply transmits whatever packet size it deems appropriate independently of a PMTU size which might otherwise have been established.

Continuing with FIG. 3, the system of the invention may further include an aging timer 82, which would cause an attempt to rediscover a PMTU using the current estimate. Additional function may be provided in the system which responds when an unsolicited ICMP Needfrag Error Packet is detected, 84. Such an unsolicited Error Packet would typically be indicative of a change in the network topology of the Internet 12 which, quite understandably, should trigger, as in the case of the aging timer 82, a re-initiation of the discovery process of steps 86–100. An additional PMTU increase detection timer 79 will periodically trigger detection of PMTU increases due to network changes through steps 80–100.

When a connection is made by an application, 76, a specific entry will be made in the routing table of the connection, e.g., the route may be said to be "cloned", 78. When the PMTU is later then discovered or established, that PMTU will be specific to this route and thereby specifically associated with that routing entry at block 78.

In summary, the methodology of the subject invention is to employ the Internet control message protocol (ICMP) echo request messages (probes) to detect the PMTU instead of the actual payload data. Because the ICMP probes are utilized instead of actual payload data, the PMTU discovery process may be initiated as soon as the connection information is obtained without having to wait for applications to actually transmit data. Applications do not have to specify the DF option in their payload data packets in order to detect PMTUs, which minimizes the data packet loss while at the same time improving the probability of avoiding fragmentation.

The implementation described herein for PMTU discovery sends out an ICMP Echo Request of the size of the outgoing interface MTU with DF option set to the destination or target host, and then awaits response and processing of the response. If the request makes it all the way to the target and the response therefrom is received successfully by the host, then the PMTU for that connection may be said to have been discovered. If, on the other hand, an error packet (e.g., "destination unreachable, needs fragmentation") is received by the local host system, the PMTU estimate is reduced and the PMTU discovery process retried. The PMTU discovery process ends when the host's estimate of the PMTU is low enough that packets will reach the destination without fragmentation at the PMTU value.

Because of the dynamic nature of Internet paths, provision is made for such PMTU discovery to adapt to route changes. Reductions to PMTUs are detected immediately if the applications choose to specify the DF option. Even otherwise, though, discovery in the case of reductions to PMTU are attempted based upon PMTU aging, as well as attempts to discover PMTU increases periodically.

PMTU discovery for UDP applications is initiated when such applications make a Find function call to the socket layer in the case where an application has made a connection and the destination is thereby known. If the destination is not known or changes, PMTU discovery will be initiated as soon as destination information is available. In the case of TCP applications, PMTU discovery initiation is simply a part of the connection setup process and thereby effected more transparently than in the case of UDP.

Non-host routes are cloned into host routes for the PMTU discovery process to work and to be able to unambiguously represent an Internet path in the system. Cloned routes are aged and deleted when the routes are no longer in use. Route data structures are modified to include PMTU information. Therefore, all connections sharing the route (path) will be able to make use of the PMTU information.

In addition to the system addressing and solving the problem of dynamically and transparently discovering PMTU, in the implementation described herein, it is contemplated that suitable APIs be provided to make effective use of the PMTU discovery feature. Accordingly, previously described socket options are defined to provide an API utilizing socket system calls which include Find, Dontfrag, and Age. Appropriate SET and GET interfaces to the socket layer are also desirably provided which can be utilized with these Find, Dontfrag, and Age socket options to enable or disable PMTU discovery, to retrieve a PMTU value, to enable or disable allowing data fragmentation, and to set PMTU age which, in turn, is employed to trigger rediscovery of PMTU in order to adapt to route changes.

Finally, the operating system kernel is preferably modified to maintain a dynamic table of commonly used MTUs. The dynamic PMTU discovery feature of the system utilizes these MTU table values while seeking to discover the PMTU. APIs and commands are further preferably defined for the administrative user to enable the user to add or delete MTUs to or from this list as desired.

Because the ICMP probe messages are employed instead of payload data to discover PMTUs, numerous advantages are obtained which were previously described and may be summarized as follows. First, PMTU discovery may be initiated as soon as the connection information is available instead of waiting for the application to transmit data. Secondly, because there is no dependence upon setting the DF option in the payload data for detecting PMTUs, applications such as video servers need not specify the DF option so as to minimize data packet loss or drop while maximizing the probability of avoiding fragmentation. Still further, the invention described herein allows for multiple connections sharing the path to take advantage of the PMTU information. Moreover, while the PMTU discovery and utilization of PMTU information is made transparent to TCP applications, it nevertheless permits UDP applications to control PMTU discovery and to be able to use PMTU information on a per socket basis.

While the invention has been shown and described with reference to particular embodiments thereof, it will be understood by those skilled in the art that the foregoing and other changes in form and detail may be made therein without departing from the spirit and scope of the invention.

We claim:

1. A method for discovering path maximum transfer unit (PMTU) in an Internet system having a local system and a target system interconnected by said Internet, comprising:

transmitting an Internet control message protocol (ICMP) echo request packet independent of payload data with the DF bit set from said local system onto said Internet;

receiving from said target system at said local system an ICMP echo response packet;

detecting at said local system an ICMP needfrag error packet;

reducing said initial PMTU value by an amount determined from said local system; and resending from said local system a next PMTU value containing said reduced PMTU value.

2. The method of claim 1, further including the steps of:

receiving at said local system a next ICMP needfrag error packet in response to said sending a next ICMP echo request packet;

reducing said reduced PMTU value in response to said receiving said next ICMP needfrag error packet;

sending from said local system a next ICMP echo request packet containing said next reduced PMTU value; and repeating the above steps until said ICMP echo response packet is received.

3. The method of claim 2 wherein said initial PMTU value is the value of the MTU of the interface between said local system and said Internet.

4. An apparatus for discovering path maximum transfer unit (PMTU) in an Internet system having a local system and a target system interconnected by said Internet, comprising:

means for transmitting an Internet control message protocol (ICMP) echo request packet independent of payload data with the DF bit set from said local system onto said Internet;

means for receiving from said target system at said local system an ICMP echo response packet;

means for detecting at said local system an ICMP needfrag error packet;

means for reducing said initial PMTU value by an amount determined from said local system; and means for resending from said local system a next PMTU value containing said reduced PMTU value.

5. The apparatus of claim 4 further including:

means for receiving at said local system a next ICMP needfrag error packet in response to said sending a next ICMP echo request packet;

means for reducing said reduced PMTU value in response to said receiving said next ICMP needfrag error packet;

means for sending from said local system a next ICMP echo request packet containing said next reduced PMTU value; and means for repeating the above steps until said ICMP echo response packet is received.

6. The apparatus of claim 5 wherein said initial PMTU value is the value of the MTU of the interface between said local system and said Internet.

* * * * *